United States Patent
Ren et al.

(10) Patent No.: US 12,422,351 B2
(45) Date of Patent: Sep. 23, 2025

(54) PUMP-PROBE PHOTOTHERMAL SPECTROSCOPY HAVING PASSIVE PHASE DETECTION AND AN OPTICAL WAVEGUIDE

(71) Applicant: The Chinese University of Hong Kong, Hong Kong (CN)

(72) Inventors: Wei Ren, Hong Kong (CN); Chenyu Yao, Ping Village (CN); Mengyuan Hu, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 17/810,145

(22) Filed: Jun. 30, 2022

(65) Prior Publication Data
US 2023/0003635 A1  Jan. 5, 2023

Related U.S. Application Data

(60) Provisional application No. 63/217,096, filed on Jun. 30, 2021.

(51) Int. Cl.
*G01N 21/17* (2006.01)
*G01N 21/45* (2006.01)

(52) U.S. Cl.
CPC .......... *G01N 21/171* (2013.01); *G01N 21/45* (2013.01); *G01N 2021/1714* (2013.01); *G01N 2021/458* (2013.01)

(58) Field of Classification Search
CPC ..... G01N 2021/1714; G01N 2021/458; G01N 21/171; G01N 21/45
See application file for complete search history.

(56) References Cited

U.S. PATENT DOCUMENTS

| 5,586,824 A | * | 12/1996 | Barkyoumb | ........... G01N 25/18 |
| | | | | 73/159 |
| 5,926,273 A | * | 7/1999 | Kimura | .................. G01N 21/17 |
| | | | | 356/502 |

(Continued)

FOREIGN PATENT DOCUMENTS

| CN | 103175807 A | 6/2013 |
| CN | 104596996 A | 5/2015 |

(Continued)

OTHER PUBLICATIONS

Yao, C., et al., "Heterodyne interferometric photothermal spectroscopy for gas detection in a hollow-core fiber," Sensors and Actuators: B. Chemical, 2021, 346:1-7.

(Continued)

*Primary Examiner* — Tarifur R Chowdhury
*Assistant Examiner* — Kemaya Nguyen
(74) *Attorney, Agent, or Firm* — Saliwanchik, Lloyd & Eisenschenk

(57) ABSTRACT

A passive-phase-detection photothermal spectroscopy (PTS) system and methods are provided for gas measurements. The PTS system includes a pump laser source, a probe laser source, the pump and probe laser beams simultaneously propagating through an optical waveguide having a target gas specimen. Moreover, the PTS system can be based on a heterodyne detection scheme and includes a combiner configured to align light input from a local oscillator with the probe laser beam output from the optical waveguide to output to a photodetector that is configured to generate beat notes. A lock-in phase detector and a lock-in amplitude detector is configured to detect and measure a photothermal signal based on the beat notes received from the photodetector for gas measurements. The PTS system can also be based on a core-cladding-mode interference detection (Continued)

scheme and generates the core mode and cladding mode simultaneously for the probe laser in the waveguide.

4 Claims, 10 Drawing Sheets

(56) References Cited

U.S. PATENT DOCUMENTS

| | | | | |
|---|---|---|---|---|
| 9,160,137 | B1* | 10/2015 | Abdolvand | H01S 3/0092 |
| 9,846,118 | B2* | 12/2017 | Jin | G01N 21/1717 |
| 11,480,518 | B2* | 10/2022 | Prater | G02B 21/002 |
| 11,619,689 | B2* | 4/2023 | Saito | G01R 33/26 |
| | | | | 324/244.1 |
| 2005/0062971 | A1* | 3/2005 | Salnik | G01N 21/636 |
| | | | | 356/432 |
| 2005/0105099 | A1 | 5/2005 | Shpantzer et al. | |
| 2017/0292935 | A1* | 10/2017 | Ren | G01N 29/022 |
| 2017/0299508 | A1* | 10/2017 | Jin | G02B 6/02328 |
| 2020/0049549 | A1* | 2/2020 | Pruessner | G01J 1/42 |
| 2021/0164894 | A1* | 6/2021 | Prater | G01N 21/171 |
| 2022/0283363 | A1* | 9/2022 | Logunov | C03C 25/68 |
| 2023/0251190 | A1* | 8/2023 | Prater | A61B 5/0086 |
| | | | | 250/339.08 |

FOREIGN PATENT DOCUMENTS

| | | |
|---|---|---|
| CN | 110098556 A | 8/2019 |
| CN | 110726697 A | 1/2020 |
| CN | 112683876 A | 4/2021 |

OTHER PUBLICATIONS

Hu, M., et al., "Mid-Infrared Photothermal Gas Sensor Enabled by Core-Cladding Mode Interference in a Hollow-Core Fiber," Journal of Lightwave Technology, 2022, 40(19):6568-6575.

International Search Report in International Application No. PCT/CN2022/102690, dated Sep. 28, 2022.

* cited by examiner

PUMP-PROBE PHOTOTHERMAL SPECTROSCOPY HAVING PASSIVE PHASE DETECTION AND AN OPTICAL WAVEGUIDE

CROSS-REFERENCE TO RELATED APPLICATION

This application claims the benefit of U.S. Provisional Application Ser. No. 63/217,096, filed Jun. 30, 2021, which is hereby incorporated by reference in its entirety including any tables, figures, or drawings.

FIELD OF INVENTION

This invention relates to gas sensing technology, in particular to gas sensing devices and methods that are based on pump-probe photothermal spectroscopy having passive phase detection and an optical waveguide.

BACKGROUND OF THE INVENTION

Photothermal spectroscopy (PTS) is a highly-sensitive, background-free spectroscopic technique for chemical analysis. PTS generally adopts a pump-probe dual-laser configuration, in which a pump laser beam is generated to excite sample molecules and a probe laser beam is generated to simultaneously pass through a heated region with the pump laser beam to induce a phase shift. The concentration of absorptive molecules can then be measured by optical interferometry, since the phase modulation is proportional to the concentration of absorptive molecules.

For gas analysis, the laser spectroscopy may incorporate optical gas sensors using a gas cell where the laser beams are transmitted through the gas analyte in a single pass or multiple passes to ensure efficient light-gas interactions. Most traditional spectroscopic systems were designed for free-space gas cells including a multi-pass cell such as a Herriot cell or a White cell, or an optical cavity such as a Fabry-Perot cavity with bulky optical elements. Alternatively, the laser spectroscopy may include an optical waveguide in which the light propagation and gas analysis are performed in order to reduce the sensor dimensions and the system complexity, as well as to enhance the light-gas interaction.

Compared with the free-space systems, optical waveguides with a small mode field diameter enhance laser intensity and facilitate thermal conduction, improving the sensitivity of photothermal detection. Several photothermal gas sensor designs based on optical waveguides have previously been investigated, achieving sensitivities higher than the sensitives of the conventional free space sensors in term of normalized noise equivalent absorption coefficient. For instance, U.S. Pat. No. 9,846,118B2 discloses designs of a gas sensor in which a hollow core photonic bandgap fiber was filled with target gas and simultaneously coupled with a probe light source and a pump light source. The PTS based on the hollow core fiber achieved a high sensitivity and a large dynamic range for gas detection.

However, the existing PTS systems generally employ a demodulation scheme based on active homodyne detection technique in which the interferometer is required to be stabilized at the quadrature point in order to obtain a linear phase response and a maximum sensitivity, making operations of the interferometer complex and difficult. Moreover, since a servo-control loop is used to monitor the drift of the quadrature point by directly adjusting the probe wavelength or the optical path length via phase modulators, the measurements are sensitive to environmental disturbance. The use of actuators may additionally introduce mechanical and electrical noises to the PTS system. When the environmental disturbance drives the interferometer out of its dynamic range, the servo-control loop has to be reset.

BRIEF SUMMARY OF THE INVENTION

There continues to be a need in the art for improved designs and techniques for a system to measure characteristics of gas specimens with high sensitivities and ease of use without requirement of a servo-control loop system.

Embodiments of the subject invention pertain to a pump-probe photothermal spectroscopic system having passive phase detection and an optical waveguide.

According to an embodiment of the subject invention, a system for gas measurements based on photothermal spectroscopy (PTS) can comprise a pump laser source generating a pump laser beam propagating through a target gas specimen, a wavelength of the pump laser beam being tuned around the absorption characteristics of the target gas specimen to be measured; the pump laser source being simultaneously wavelength and/or amplitude modulated at a frequency, f (in kHz); an optical coupler coupling the pump laser source with an optical waveguide; an optical waveguide configured to transmit the pump laser beams through gas medium containing the target gas specimen to be measured; a laser driver configured to control temperature and injection current of the pump laser source; a signal generator connected to the laser driver and configured to provide modulation to the pump laser source; a probe laser source generating a probe laser beam connected to the optical coupler and coupled to the optical waveguide; an optical filter connected to an output of the optical waveguide and configured to filter out the pump laser beam and to transmit the probe laser beam. The probe laser beam and the pump laser beam simultaneously propagate through the optical waveguide. The optical waveguide can be an inner-coating hollow core fiber, a hollow-core anti-resonant fiber, or a slot waveguide, disposed in the target gas specimen. Furthermore, the probe laser beam is phase modulated due to the photothermal effect, and the harmonic components of the photothermal phase signal have a linear relationship with a gas concentration of the target gas specimen.

Based on the pump-probe PTS system, embodiments of two systems for the passive phase detection of the probe laser beam propagating through the gas specimen inside the waveguide are provided.

The first photothermal passive phase detection system based on heterodyne interferometry includes, a local oscillator generating a local oscillator light with a frequency shift, $\Omega$ (in MHz), with respect to the probe laser frequency; a combiner connected to the local oscillator and an output of the optical filter and configured to align the local oscillator light with the probe laser beam output from the optical filter; a photodetector connected to the combiner and configured to generate beat notes when the probe laser beam and local oscillator light are simultaneously received by the photodetector; and a demodulation module connected to the photodetector and configured to detect and measure a photothermal signal based on the beat notes received from the photodetector for gas measurements. The local oscillator provides a fixed frequency shift ($\Omega$) with respect to the frequency of the probe laser beam.

The demodulation module for extracting the harmonic components of the photothermal phase signal comprises a digital lock-in phase detector and a digital lock-in amplitude detector. The digital lock-in phase detector comprises a splitter, a first mixer, a first reference source, a first low pass filter, a second mixer, a second reference source, a second low pass filter, a divider and a digital arctangent module. The digital lock-in amplitude detector comprises a third mixer, a third reference source, and a third low pass filter. The demodulation method can comprise providing, by a reference source, reference signals; generating, by a photodetector, beat note signals; demodulating, by a digital lock-in phase detector, phases of the beat note signals; and demodulating, by a digital lock-in amplitude detector, harmonic signals of PTS from the demodulated phases of the beat note signals for gas measurement. The method additionally comprises splitting the beat note signals into first and second beat note signals, mixing the first and second beat note signals with an in-phase reference signal and a quadrature reference signal, respectively, and transmitting the first and second beat note signals that are mixed with corresponding reference signals through first and second low pass filters, respectively. The phases of beat note signals are determined by a digital arc tangent method. The demodulated phase signal of the beat note is mixed with a reference at a frequency equal to a multiple of f, such as f, 2f, or 3f, and transmitting through a low pass filter.

The second photothermal passive phase detection method based on core-cladding-mode interference can comprise generating, by coupling the probe light into the cladding region and core region of the waveguide, a core mode and a cladding mode simultaneously; generating by a photodetector, the mode interference signals; and demodulating, by a digital lock-in amplifier, the harmonic signals from the mode interference output.

DETAILED DISCLOSURE OF THE INVENTION

Embodiments of the subject invention adopt passive phase detection methods including heterodyne detection scheme and core-cladding-mode interference detection scheme to replace the conventional homodyne detection scheme requiring active opto-mechanical stabilization to implement photothermal gas detection.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1A:
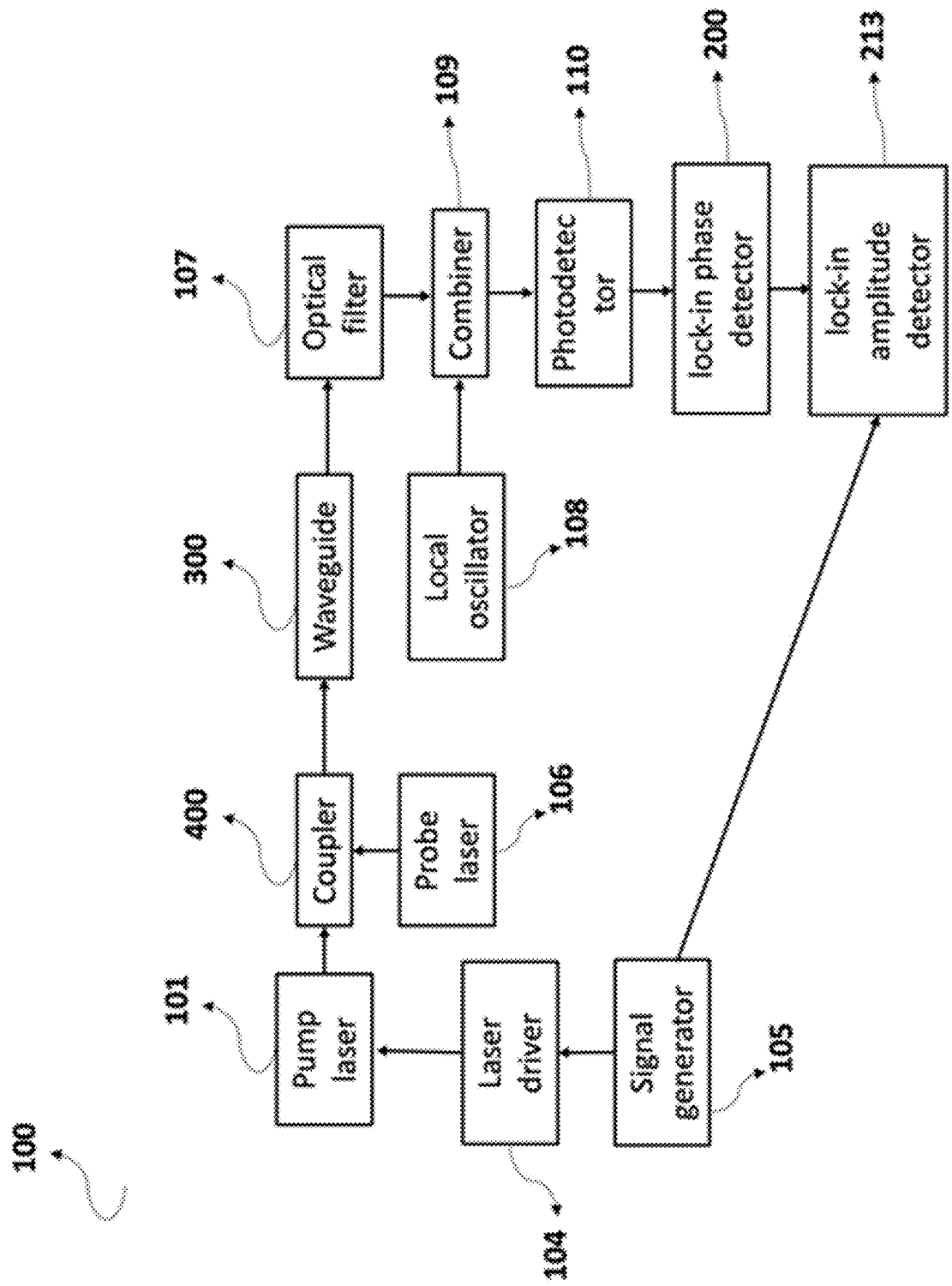
FIG. 1A is a schematic representation of pump-probe photothermal spectroscopy (PTS) system having a heterodyne interferometry and an optical waveguide according to an embodiment of the subject invention.

Referring to FIG. 1A, the heterodyne interferometric photothermal spectroscopy (PTS) system 100 comprises a pump laser source 101 for generating a pump laser beam configured to have the absorption characteristics of a target gas specimen. A wavelength of the pump laser beam can be tuned across the absorption feature of the target gas specimen to be measured. A laser driver 104 is coupled to the pump laser source 101 to control temperatures and injection currents of the pump laser source 101, and a signal generator 105 is also coupled to the laser driver 104 and configured to provide modulations to the pump laser source 101 via the laser driver 104.

In one embodiment, the wavelength and the intensity of the pump laser source 101 can be individually or simultaneously modulated at a frequency of f.

The heterodyne interferometric PTS system 100 further comprises an optical coupler 400 coupled to the pump laser source 101 to receive the pump laser beam at one end and coupled to an optical waveguide 300 at another end. The optical waveguide 300 is configured to receive optical waves of the pump laser beam output from the optical coupler 400 and to transmit the optical waves through gas medium containing a target gas specimen to be measured.

Referring to FIG. 1A again, a probe laser source 106 for generating a probe laser beam is coupled to the optical waveguide 300 via the optical coupler 400, allowing the probe laser beam generated to mix with the pump laser beam when being simultaneously transmitted through the gas medium on a path guided by the optical waveguide 300. The probe laser beam senses the photothermal effects of the target gas specimen and performs a phase shift when propagating through the gas medium in the optical waveguide 300.

After outputting from the optical waveguide 300, the pump laser beam of the mixed beams is filtered out by an optical filter 107 coupled to the optical waveguide 300, while the probe laser beam is transmitted by the optical filter 107 to a combiner 109 that is coupled to the optical filter 107 at one end and is in connection with a local oscillator 108 at another end. The local oscillator 108 provides a light output having a fixed offset £2 in frequency with respect to the frequency of the probe laser 106.

In one embodiment, both the probe laser source 106 and the local oscillator 108 are continuous-wave (CW) sources, emitting light beams of fixed optical power and of a fixed wavelength absent disturbance.

In FIG. 1A, the combiner 109 is configured to perfectly align the probe laser beam and the light output from the local oscillator 108. Further, a photodetector 110 is coupled to the output of the combiner 109.

Figure 1B:
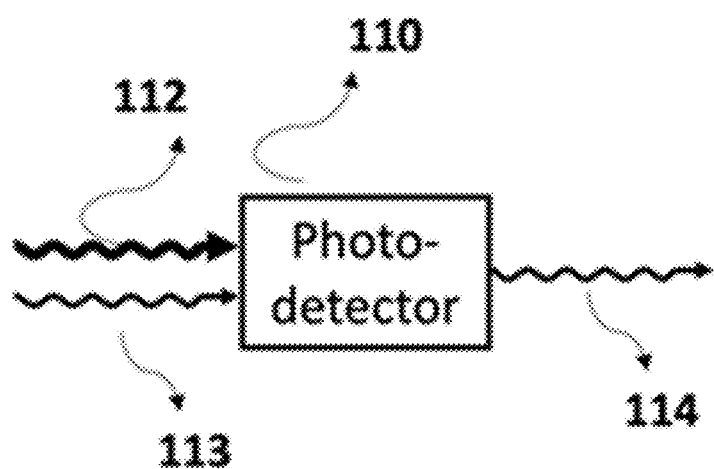
FIG. 1B is a schematic representation of the heterodyne beat note signal generation on a photodetector of the PTS system of FIG. 1A, according to an embodiment of the subject invention.

As illustrated in FIG. 1B, the photodetector 110 is configured to capture the probe laser beam 112 from the optical waveguide 300 and the light beam 113 from the local oscillator 108, generating a beat note 114 at the frequency 2. As a result, the photothermal phase signal characterizing the target gas specimen is encoded into the phase of the beat note 114.

In one embodiment, the photodetector 110 is a square-law photodetector for capturing the beat note generated by the probe laser beam 112 transmitted through the optical waveguide 300 and the light beam 113 generated by the local oscillator 108.

Referring to FIG. 1A again, the heterodyne interferometric PTS system 100 further comprises a lock-in phase detector 200 coupled to the photodetector 110 to receive the beat note 114 and configured to demodulate the phase of the beat note 114. The lock-in phase detector 200 is coupled to a lock-in amplitude detector 213 and the lock-in amplitude detector 213 receives a signal input from the signal generator 105 to perform the demodulation. The digital lock-in amplitude detector 213 is configured to demodulate harmonic signals of photothermal spectroscopy from the demodulated phases of the beat note 114 for gas measurements.

In one embodiment, by demodulating the beat note 114, one or more characteristics, such as a concentration, a pressure, or a temperature, of the target gas specimen can be thereafter determined.

Figure 2:
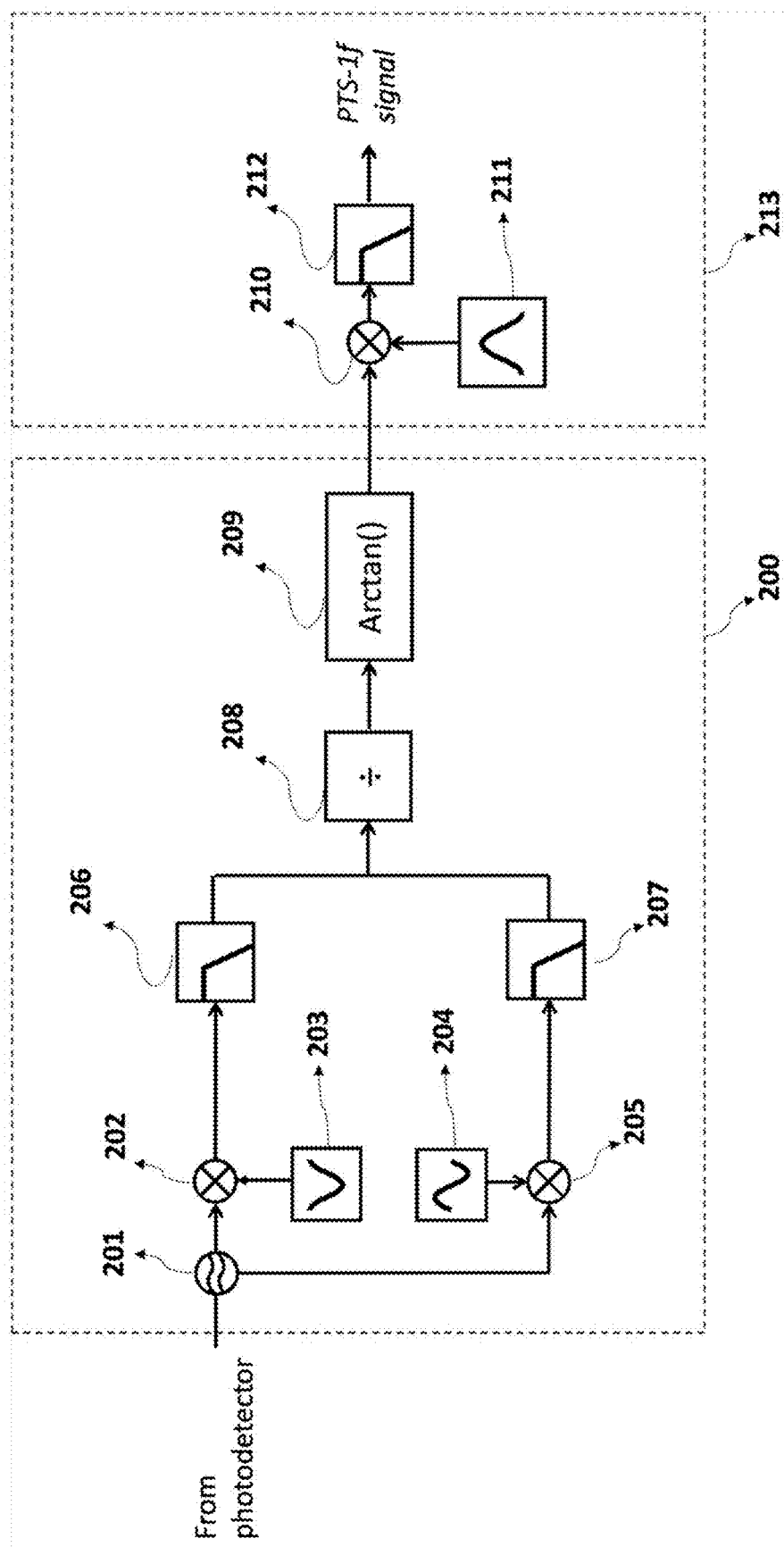
FIG. 2 is a diagram showing harmonic detection of photothermal phase signals from the lock-in phase detector and the lock-in amplitude detector of FIG. 1A, according to an embodiment of the subject invention.

FIG. 2 is a diagram showing the lock-in phase detector 200 and the lock-in amplitude detector 213 configured for detecting beat note and detecting harmonic components of the photothermal phase signals. The lock-in phase detector 200 comprises a splitter 201, a first mixer 202 having one input end coupled to one output end of the splitter 201 to receive a first output signal of the splitter 201, a first reference source 203 having an output end coupled to another input end of the first mixer 202 to provide a first reference signal to the first mixer 202, a first low pass filter 206 coupled to the first mixer 202 to receive output signals of the first mixer 202.

The lock-in phase detector 200 further comprises a second mixer 205 having an input end coupled to another output end of the splitter 201 to receive a second output signal of the splitter 201, a second reference source 204 having an output end coupled to another input end of the second mixer 205 to provide a second reference signal to the second mixer 205, and a second low pass filter 207 coupled to the second mixer 205 to receive output signals of the second mixer 205.

The lock-in phase detector 200 additionally comprises a divider 208 having an input end coupled to both the first low pass filter 206 and the second low pass filter 207 to receive outputs of both the first low pass filter 206 and the second low pass filter 207, a digital arctangent module 209 coupled to an output of the divider 208 to receive output signals of the divider 208 The lock-in amplitude detector 213 comprises a third mixer 210 having one input end coupled to an output of the digital arctangent module 209 to receive output signals of the digital arctangent module 209, a third reference source 211 coupled to another input end of the third mixer 210 to provide a third reference signal to the third mixer 210, and a third low pass filter 212 coupled to an output of the third mixer 210 to receive output signals of the third mixer 210.

The embodiments of subject invention also provide a gas measuring method comprising following steps.

Figure 3:
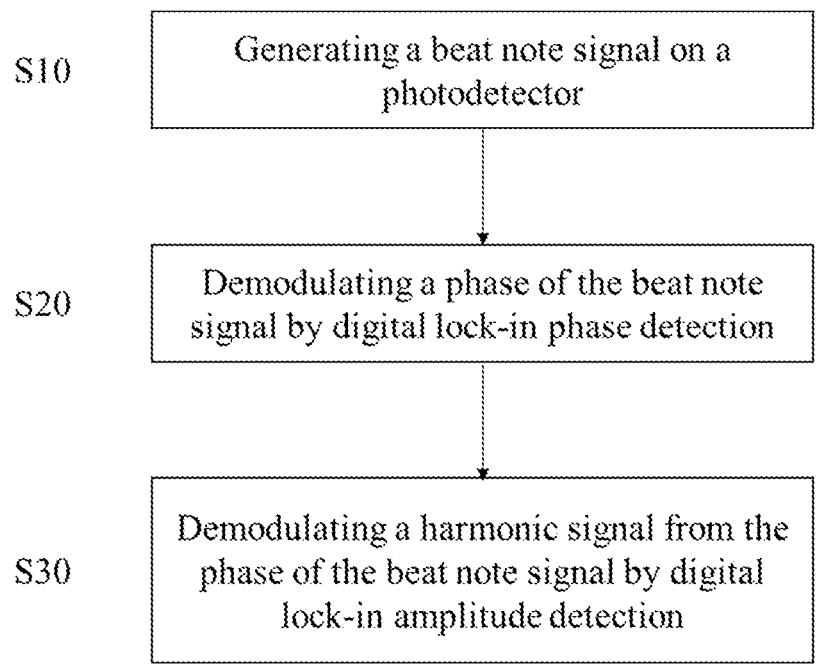
FIG. 3 is a flow diagram showing a method for gas measurements by demodulating photothermal signals based on the heterodyne PTS, according to an embodiment of the subject invention.

Referring to FIG. 3, at a step S10, the light beam 113 is generated by the local oscillator 108 having a frequency shifted by Ω against the optical frequency of the probe laser beam 112 having a phase modulation due to the photothermal effect, and then a beat note signal 114 is generated by the photodetector 110. At this step, when the pump laser beam at a certain wavelength passes through the gas medium containing the target gas specimen, a portion of the laser power is absorbed when the laser wavelength is in resonance with a specific absorption line of the target gas specimen. When the wavelength and/or intensity of the pump laser beam is modulated at a frequency of f (in kHz), a periodic heating process occurs and subsequently changes the refractive index of the gas medium. The refractive index variation leads to the phase modulation of the probe laser beam that travels along the same path of the pump laser beam in the optical waveguide. The phase signal of the probe laser is relevant to the absorption path length, pump power and absorption coefficient. When these two perfectly aligned plane waves of the probe laser beam 112 and the local oscillator light beam 113 with the frequency difference of $\Omega$ are received by the square-law photodetector 110, a heterodyne beat note 114 at the frequency $\Omega$ is generated. It is noted that the phase signal also propagates through the beat note 114.

Then, at a step S20, the phase of the beat note signal is demodulated by digital lock-in phase detection. At this step, the beat note 114 is split into two ways. The beat note of the first way is mixed with a first reference signal at the frequency $\Omega$ provided by the first reference source 203. The beat note of the second way is mixed with a second reference signal at a frequency $\Omega$ provided by the second reference source 204. The reference signals generated by the first reference source 203 and the second reference source 204 have a phase difference of 90°. The mixed signal of the first way and the mixed signal of the second way are filtered by the first low-pass filter 206 and the second low-pass filter 207, respectively.

Next, the divider 208 is configured to compare the output signals from the first low-pass filter 206 and the second low-pass filter 207. The digital arc tangent module 209 is then configured to determine the phase of the beat note signal.

Further, at a step S30, the harmonic signal of the PTS from the phase of the beat note is demodulated by digital lock-in amplitude detection. The signal at frequency f generated from the signal generator 105 is provided as the reference signal for the third reference source 211. At this step, an in-phase reference signal generated by the third reference source 211 is mixed with the beat note phase signal to extract a harmonic component at a frequency which is a multiple of f, such as f, 2f, or 3f. The first harmonic (1f) and second harmonic (2f) signals are provided for gas measurement. The third low-pass filter 212 is configured to eliminate high-frequency components of the mixed signal output from the third mixer 210.

Figure 4A:
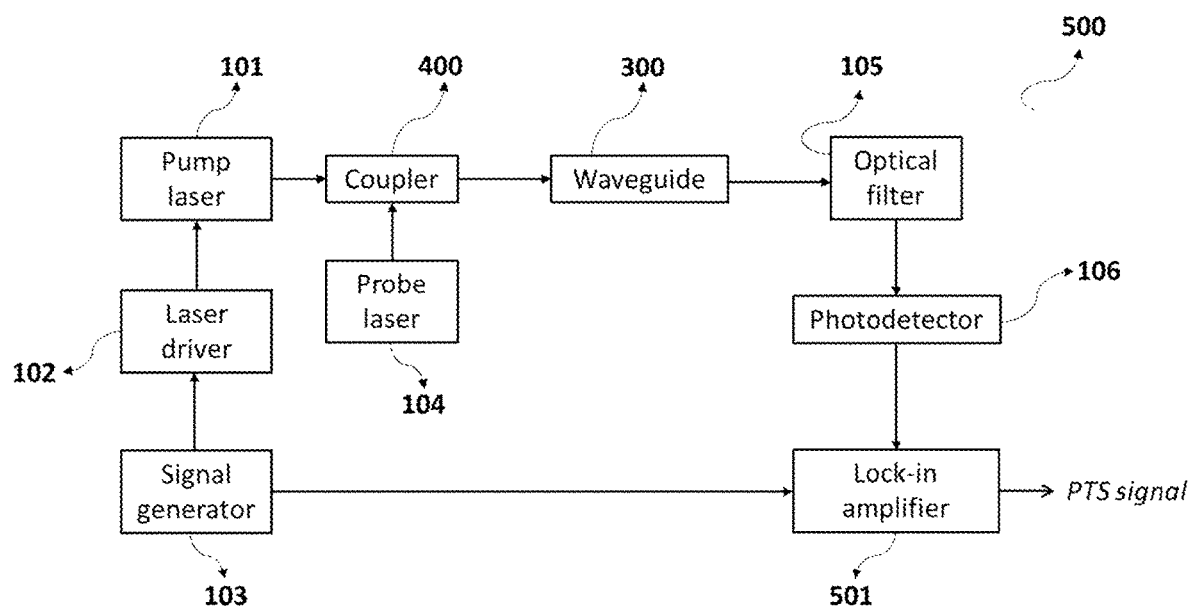
FIG. 4A is a schematic representation of the PTS system having a core-cladding-mode interferometry and an optical waveguide according to an embodiment of the subject invention.

Referring to FIG. 4A, the core-cladding-mode interference PTS system 500 comprises the same components and arrangements of the pump laser source 101, the laser driver 104, the signal generator 105, the probe laser source 106, the optical coupler 400, the optical waveguide 300, and the optical filter 107, included in the heterodyne PTS system shown in FIG. 1A.

Figure 4B:
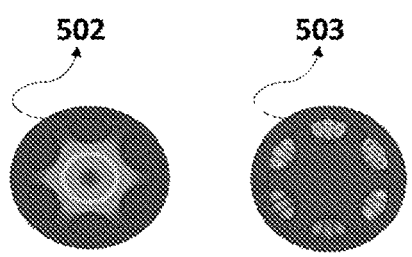
FIG. 4B is a schematic representation of a core mode and a cladding mode propagating along the waveguide according to an embodiment of the subject invention.

In FIG. 4B, when the probe laser source 106 is coupled to the waveguide 300, a portion of the probe light enters the cladding region while another portion of the probe light enters the core region of the waveguide 300. The spectral transmission of the probe laser inside the waveguide 300 includes the interference between the core mode 502 and cladding mode 503.

Referring to FIG. 4A again, the core mode 502 and cladding mode 503 both propagate along the waveguide 300, but meeting different refractive index values, leading to a mode interference at the fiber output which is detected by the photodetector 110. The photodetector signal is analyzed by a lock-in amplifier 501 with the reference signal generated from the signal generator 105 for the first (1f) or second harmonic (2f) detection. The harmonic signals of the mode interference output provide information such as the concentration, the pressure or the temperature of the gas specimen.

Compared to the conventional active homodyne detection method, the passive phase detection of photothermal signal generated according to the embodiments of the subject invention does not require active stabilization of the quadrature point of the interferometer, significantly simplifying the sensor configuration and eliminating the electronic noises caused by the piezoelectric actuator.

Moreover, in the embodiments of the subject invention, the local oscillator 108 is configured to down-convert the optical frequency to RF which can be readily analyzed by a high-speed lock-in amplifier. Since the phase detection process normalizes the amplitude components, the resultant signal has an intrinsic immunity to the amplitude variation of the heterodyne photocurrent, offering advantages when there is a change of the heterodyne amplitude caused by the unavoidable power and polarization variation. It is known that a strict power balance and polarization control between the two arms of an interferometer is required in homodyne detections. Any amplitude fluctuation of the homodyne signal may cause the reset of the stabilization circuit or signal fading issues.

Figure 5A:
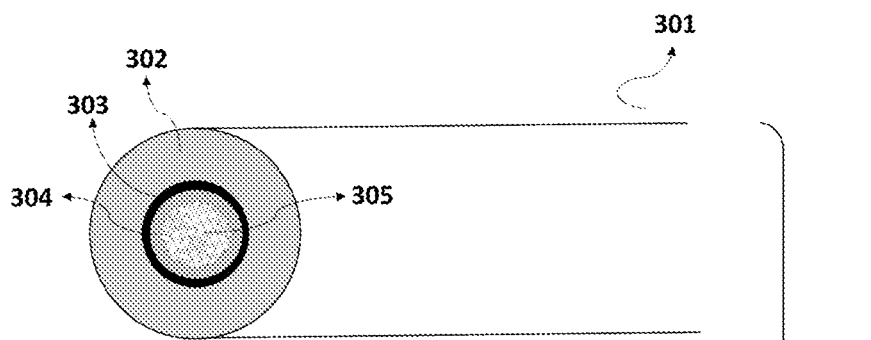
FIG. 5A is a schematic representation of the optical waveguide implemented by an inner-coating hollow core fiber according to an embodiment of the subject invention.
Figure 5B:
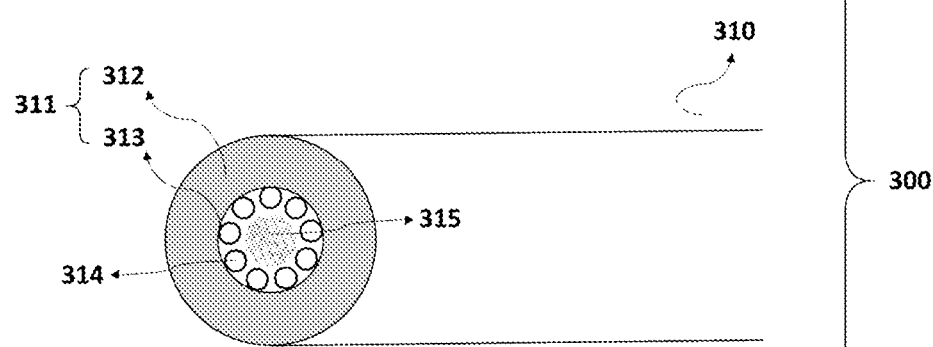
FIG. 5B is a schematic representation of the optical waveguide implemented by a hollow-core anti-resonant fiber according to an embodiment of the subject invention.
Figure 5C:
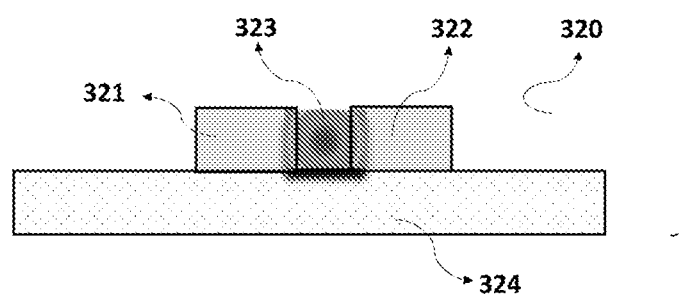
FIG. 5C is a schematic representation of the optical waveguide implemented by a slot waveguide according to an embodiment of the subject invention.

Now referring to FIGS. 5A-5C in which various configurations of the optical waveguide 300 of the PTS system 100 can be employed for light beam transmissions and light-gas interactions.

In one embodiment, as shown in FIG. 5A, the optical waveguide 300 can be implemented by an inner-coating hollow core fiber 301. The inner-coating hollow core fiber 301 is formed to have a tubular shape, comprising a protection layer 302 made of a material such as glass or plastics, a reflective coating layer 303 made of a material such as silver, a dielectric coating layer 304 made of a material such as silver iodide, and a hollow core region 305 filled with gas medium containing the target gas specimen to be measured.

In one embodiment, the hollow core region 305 can be configured to have a diameter in a range of 200-500 microns and to extend along a longitudinal axis of the inner-coating hollow core fiber 301. Light beams are configured to travel inside the hollow core region 305. Moreover, the inner-coating hollow core fiber 301 may have a spectral transmission window in a range between 2 microns and 16 microns.

Referring now to FIG. 5B, in another embodiment of the subject invention, the optical waveguide can be implemented by a hollow-core anti-resonant fiber 310. The fiber 310 is formed to have a tubular shape, comprising a hollow core region 315 and a cladding layer 311. The cladding layer 311 can be configured to have an outer cladding layer 312 and an inner cladding layer 313; a single ring of capillaries 314 can be configured to make up the inner cladding layer 313, and a small gap is left between two adjacent capillaries 314. The cladding layer can be made of, for example, silica and soft glass materials. The hollow core region 315 extends along the longitudinal axis of the hollow-core anti-resonant fiber 310 and may have a diameter in a range of 50-100 microns, surrounded by 6-8 capillaries. The light beams are configured to travel inside the hollow core region 315.

In addition, as illustrated in FIG. 5C, in another embodiment of the subject invention, the optical waveguide can be implemented by a slot waveguide 320. A slot waveguide comprises a first strip 321 and a second strip 322 of high-refractive-index materials separated by a sub-wavelength-scale low-refractive-index slot region 323. The first strip 321 and the second strip 322 are disposed on a substrate 324. A portion of the guided light is located in the slot region 323 by the means of evanescent wave. The high-refractiveindex material can be silicon, silicon nitride, lithium niobate or chalcogenide. The low-refractive-index slot region 323 is filled with gas medium having the gas species to be detected. Compared with fiber-optic gas sensors, the slot waveguide has the advantage of monolithic integration, allowing providing the integrated sensing element, the laser source and the photodetector on a single chip.

Figure 6A:
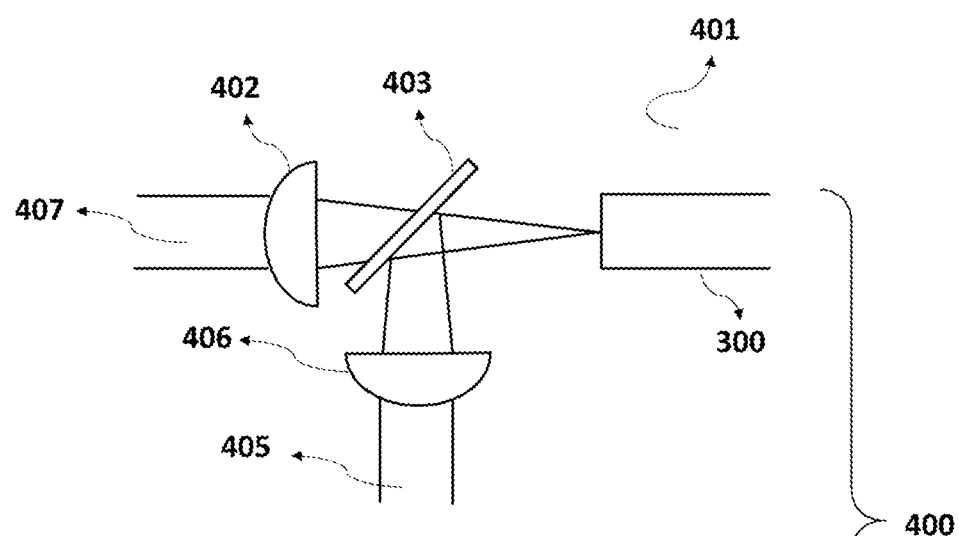
FIG. 6A is a schematic representation of a free-space optical coupler of the PTS system of FIG. 1A and FIG. 1B, according to an embodiment of the subject invention.
Figure 6B:
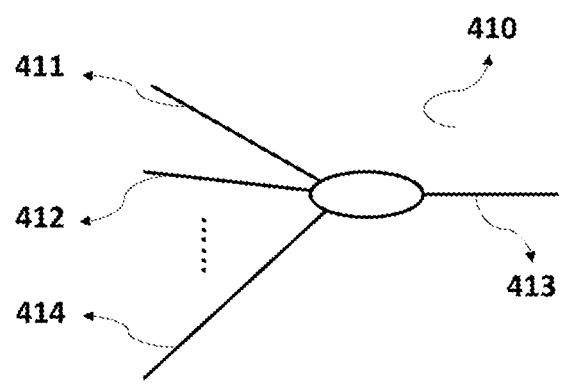
FIG. 6B is a schematic representation of a fiber-optic coupler of the PTS system of FIG. 1A and FIG. 1B, according to an embodiment of the subject invention.

Referring to FIGS. 6A-6B, various configurations of the optical coupler 400 of the PTS system 100 can be employed for light beam transmissions and light-gas interactions.

In one embodiment, as shown in FIG. 6A, the optical coupler 401 comprises a first lens 402, a dichroic mirror (or beam splitter) 403, and a second lens 406. The optical coupler 401 is configured to couple the pump laser beam 407 and probe laser beam 405 to simultaneously propagate through the optical waveguide 300. The pump laser beam 407 of the pump laser source 101 passes through the first lens 402 and the dichroic mirror 403 and then illuminates onto the facet of the optical waveguide 300 which is placed at the focal point of the first lens. The collimated beam 405 of probe laser source 106 passes through the second lens 406 and is reflected at the dichroic mirror 403 and then illuminates onto the facet of the optical waveguide 300 which is placed at the focal point of the second lens 406. The dichroic mirror 403 is configured to have high transmission rate at the wavelength of the pump laser while having high reflectivity at the wavelength of the probe laser. The free-space optical coupling can be configured for optical waveguide 300 of any dimensions by matching the focus spot size of the first lens and the second lens with the mode field diameter of the optical waveguide 300.

Referring now to FIG. 6B, in another embodiment of the subject invention, the coupler 400 can also be implemented by a fiber-optic coupler 410. The fiber coupler 410 comprises a first input fiber 411 and a second input fiber 412. The first input fiber 411 is connected to the probe laser; the second input fiber 412 is connected to the pump laser. The laser beams from the input ends are combined and launched into the common output fiber 413, which is connected to the optical waveguide 300. It is noted that two or more pump lasers could be adopted to realize multi-species detection, by selecting appropriate pump wavelengths for specific gas species and connecting the $n^{th}$ (n>1) pump laser to the $n^{th}$ input fiber 414 of the coupler 410. The coupler 410 can be butt-coupled or fusion spliced to the waveguide 300.

Figure 7:
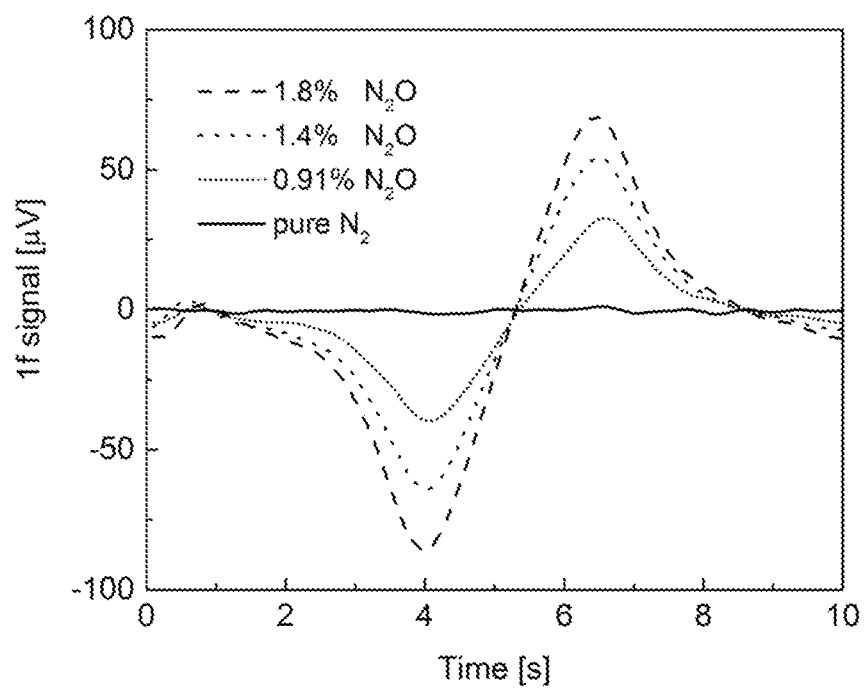
FIG. 7 is a plot diagram of results of representative photothermal signal profiles measured under different concentrations of $N_2O/N_2$ gas mixtures by the heterodyne photothermal spectroscopy (PTS) system, according to an embodiment of the subject invention.

FIG. 7 is a plot diagram of representative photothermal 1f signals measured by the heterodyne interferometric PTS system shown in FIG. 1A under different concentrations of $N_2O$ (0%, 0.91%, 1.4% and 1.8%) gas diluted by $N_2$ gas. A continuous-wave interband cascade laser emitting at 3.6 μm is used as the pump laser that is tuned across the absorption line-center of the target gas $N_2O$ at 2778.37 $cm^{-1}$. The first harmonic (1f) signal is retrieved by setting the third reference source 211 to the frequency f, higher order harmonic signals can be retrieved by simply setting the third reference source 211 to a frequency that is a multiple of f, such as f, 2f, or 3f. The signal amplitude is determined to be changed linearly with the $N_2O$ concentration. It is noted that the application of the subject invention is not limited to $N_2O$ detection. By selecting appropriate pump lasers for specific species, different types of gas molecules can be detected by the embodiments of the subject invention.

Figures 8A, 8B:
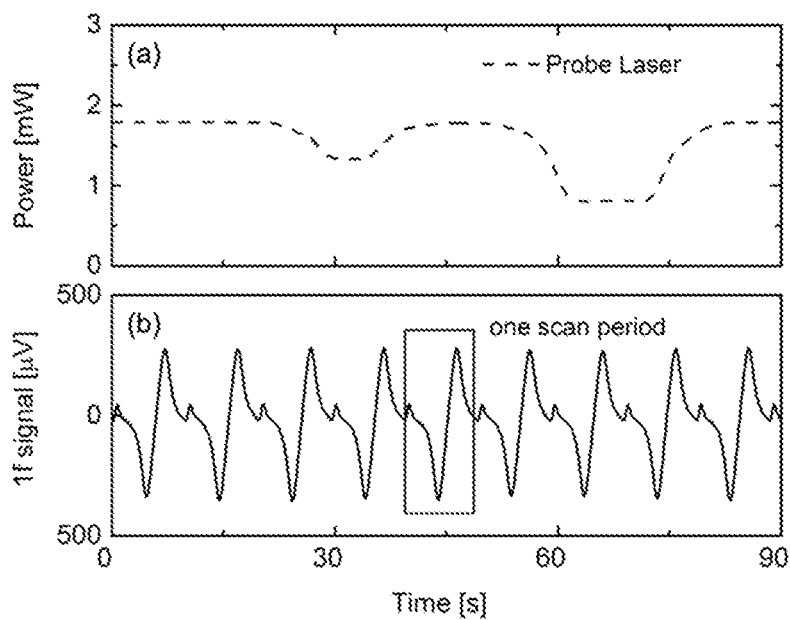
FIG. 8A is a plot diagram of results of the power fluctuation of the probe laser beam of the heterodyne PTS system, according to an embodiment of the subject invention.
FIG. 8B is a plot diagram of results of continuous monitoring of the first harmonic component of photothermal signals (9 periods) of the heterodyne PTS system under the power fluctuation of the probe laser shown in FIG. 8A, according to an embodiment of the subject invention.

FIG. 8B is a plot diagram of continuous monitoring of the first harmonic of photothermal signals for the scanned PTS-1f signal (9 periods) under the condition of the simultaneous power fluctuation of the probe laser beam shown in a plot diagram of FIG. 8A. The PTS signal is not affected by any disturbance of the probe light beams. In other embodiments, the power immunity are also be realized in other harmonic detections.

Figure 9:
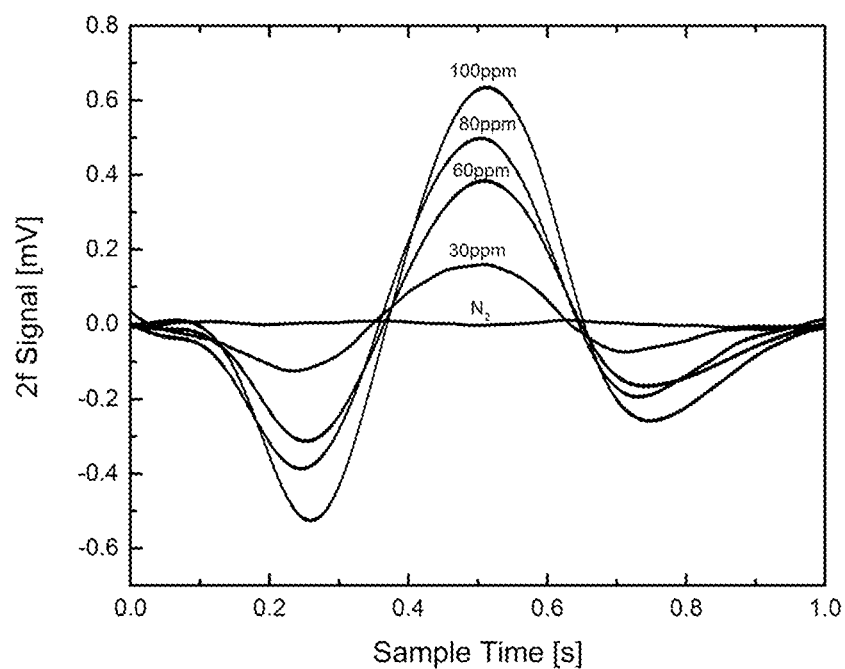
FIG. 9 is a plot diagram of results of representative photothermal signal profiles measured under different concentrations of $NO/N_2$ gas mixtures by the core-cladding-mode interference PTS system, according to an embodiment of the subject invention.

FIG. 9 is a plot diagram of representative photothermal 2f signals measured by the core-cladding-mode interference PTS system shown in FIG. 4A under different concentrations of NO (0-100 ppm) gas diluted by $N_2$ gas. A continuous-wave quantum cascade laser emitting at 5.2 μm is used as the pump laser that is tuned across the absorption line-center of the target gas NO at 1900.08 $cm^{-1}$. The signal amplitude is determined to be changed linearly with the NO concentration.

The pump-probe PTS system and methods of the subject invention employ phase-sensitive detection techniques to achieve easier retrieval of photothermal phase signals that is immune from power fluctuation and thus can be utilized for gas sensing without requiring active stabilization. Moreover, optical waveguides that contain gas medium having the target gas specimen is coupled with the PTS system, allowing real-time retrieval of the photothermal phase signal for gas measurements. Various optical waveguide configurations, including but not limited to, hollow-core fibers, or planar waveguides, can be implemented to decrease the dimensions of optical waveguide sensors while increasing the light-specimen interaction duration for higher photothermal efficiencies.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] R. F. Cregan, B. J. Mangan, J. C. Knight, T. A. Birks, P. S. J. Russell, P. J. Roberts, D. C. Allan, Single-mode photonic band gap guidance of light in air, Science. 285 (1999) 1537-1539.

[2] W. Jin, Y. Cao, F. Yang, H. L. Ho, Photothermal spectroscopy with hollow-core optical fiber, US patent, U.S. Pat. No. 9,846,118B2.

[3] C. Yao, S. Gao, Y. Wang, P. Wang, W. Jin, W. Ren, Silica Hollow-Core Negative Curvature Fibers Enable Ultrasensitive Mid-Infrared Absorption Spectroscopy, J. Light. Technol. 38 (2020) 2067-2072.

[4] C. Yao, Q. Wang, Y. Lin, W. Jin, L. Xiao, S. Gao, Y. Wang, P. Wang, W. Ren, Photothermal CO detection in a hollow-core negative curvature fiber, Opt. Lett. 44 (2019) 4048-4051.

[5] C. Yao, S. Gao, Y. Wang, P. Wang, W. Jin, W. Ren, MIR-Pump NIR-Probe fiber-optic photothermal spectroscopy with background-free first harmonic detection, IEEE Sens. J. 20 (2020) 12709-12715.

[6] F. Chen, S. Jiang, W. Jin, H. Bao, H. L. Ho, C. Wang, S. Gao, Ethane detection with mid-infrared hollow-core fiber photothermal spectroscopy, Opt. Express 28 (2020) 38115-38126.

[7] P. Zhao, Y. Zhao, H. Bao, H. L. Ho, W. Jin, S. Fan, S. Gao, Y. Wang, P. Wang, Mode-phase-difference photothermal spectroscopy for gas detection with an anti-resonant hollow-core optical fiber, Nat. Commun. 11 (2020) 1-8.

[8] W. Jin, Y. Cao, F. Yang, H. L. Ho, Ultra-sensitive all-fibre photothermal spectroscopy with large dynamic range, Nat. Commun. 6 (2015) 1-8.

[9] H. Mei, B. Li, H. Huang, R. Rao, Piezoelectric optical fiber stretcher for application in an atmospheric optical turbulence sensor, Appl. Opt. 46 (2007) 4371-4375.

[10] A. A. Freschi, J. Frejlich, Adjustable phase control in stabilized interferometry, Opt. Lett. 20 (1995) 635-637.

[11] K. Krzempek, G. Dudzik, K. Abramski, G. Wysocki, P. Jaworski, M. Nikodem, Heterodyne interferometric signal retrieval in photoacoustic spectroscopy, Opt. Express 26 (2018) 1125-1132.

[12] G. Dudzik, K. Krzempek, K. Abramski, G. Wysocki, Solid-state laser intra-cavity photothermal gas sensor, Sens. Actuator B Chem. 328 (2021) 129072.

[13] Z. Li, Z. Wang, F. Yang, W. Jin, W. Ren, Mid-infrared fiber-optic photothermal interferometry, Opt. Lett. 42 (2017) 3718-3721.

[14] J. P. Waclawek, V. C. Bauer, H. Moser, B. Lendl, 2f-wavelength modulation Fabry-Perot photothermal interferometry, Opt. Express 24 (2016) 28958-28967.

[15] J. P. Waclawek, C. Kristament, H. Moser, B. Lendl, Balanced-detection interferometric cavity-assisted photothermal spectroscopy, Opt. Express 27 (2019) 12183-12195.

We claim:

1. A method based on heterodyne interferometric photothermal spectroscopy that demodulates photothermal signals for gas measurements in optical waveguides, the method comprising:
    configuring an optical hollow-core waveguide to contain a gas sample to be measured;
    coupling a pump laser beam and a probe laser beam simultaneously into the optical waveguide that is filled with the gas sample to be measured;
    configuring a signal generator to provide wavelength modulations to a pump laser source;
    modulating phases of the probe laser beam under a photothermal effect of the gas sample in the optical waveguide;
    configuring a local oscillator to output light with a frequency shift against optical frequency of the probe laser beam that has been phase modulated;
    generating, by a photodetector, a beat note, when the probe laser beam and the light with frequency shift output from the local oscillator are simultaneously received by the photodetector, wherein the photothermal phase signal in the probe laser beam is encoded into a phase of the beat note;
    demodulating, by a digital lock-in phase detector, phases of the beat note; and
    demodulating, by a digital lock-in amplitude detector, harmonic signals of photothermal spectroscopy (PTS) from the demodulated phases of the beat note for gas measurements, wherein the demodulating is performed based on a signal input received from the signal generator,
    wherein the beat note from the photodetector is split into a first beat note and a second beat note for phase demodulation by digital lock-in phase detection, followed by mixing the first and second beat notes with an in-phase reference signal and a quadrature reference signal, respectively, wherein the in-phase reference signal and the quadrature reference signal have a phase difference of 90°.

2. The method of claim 1, wherein demodulating phases of the beat note is based on reference signal inputs received from reference sources, and wherein frequency of the reference signals equals to an optical frequency difference between the probe laser beam and the light output from the local oscillator.

3. The method of claim 2, wherein
    the first and second beat notes mixed with reference signals are transmitted through a first low-pass filter and a second low-pass filter, respectively;
    phases are calculated based on a digital arctangent method; and phase signals are output to the lock-in amplitude detector.

4. The method of claim 2, further comprising configuring the lock-in amplitude detector cascaded to the lock-in phase detector to demodulate the harmonic photothermal signals from the phase of the beat note, based on a reference signal.

* * * * *